United States Patent
Kwon et al.

(10) Patent No.: US 9,431,679 B2
(45) Date of Patent: Aug. 30, 2016

(54) ELECTRODE ASSEMBLY HAVING STEPPED PORTION, AS WELL AS BATTERY CELL, BATTERY PACK, AND DEVICE INCLUDING THE ELECTRODE ASSEMBLY

(71) Applicant: LG Chem, Ltd., Seoul (KR)

(72) Inventors: Sung-Jin Kwon, Daejeon (KR);
Soon-Ho Ahn, Daejeon (KR);
Dong-Myung Kim, Daejeon (KR);
Ki-Woong Kim, Daejeon (KR);
Young-Hoon Kim, Daejeon (KR);
Sung-Han Yoon, Daejeon (KR);
Seung-Min Ryu, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/059,757

(22) Filed: Oct. 22, 2013

(65) Prior Publication Data
US 2014/0050958 A1 Feb. 20, 2014

Related U.S. Application Data

(63) Continuation of application No. PCT/KR2013/004620, filed on May 27, 2013.

(30) Foreign Application Priority Data

May 25, 2012 (KR) .......................... 10-2012-0056326
Nov. 9, 2012 (KR) .......................... 10-2012-0127030
May 27, 2013 (KR) .......................... 10-2013-0069029

(51) Int. Cl.
*H01M 10/04* (2006.01)
*H01M 2/14* (2006.01)
(Continued)

(52) U.S. Cl.
CPC ........... *H01M 10/0583* (2013.01); *H01M 2/18* (2013.01); *H01M 10/045* (2013.01); *H01M 10/0431* (2013.01); *H01M 10/0459* (2013.01); *H01M 10/052* (2013.01); *H01M 10/0585* (2013.01); *H01M 10/0587* (2013.01); *H01M 2/22* (2013.01); *Y02E 60/122* (2013.01)

(58) Field of Classification Search
None
See application file for complete search history.

(56) References Cited

U.S. PATENT DOCUMENTS

| 3,207,630 | A | * | 9/1965 | Himy et al. | .................. 429/131 |
| 5,525,441 | A | * | 6/1996 | Reddy et al. | ................. 429/127 |
| 6,224,995 | B1 | | 5/2001 | Fauteux et al. | |
| 7,629,077 | B2 | * | 12/2009 | Bowles et al. | ................ 429/136 |

(Continued)

FOREIGN PATENT DOCUMENTS

| EP | 2256853 A1 | 12/2010 |
| JP | 2001028275 A | 1/2001 |

(Continued)

OTHER PUBLICATIONS

Machine translation of KR 1020030066960, retrieved from <http://kposd.kipo.go.kr:8088/up/kpion/> on May 21, 2015.*

(Continued)

*Primary Examiner* — Cynthia K Walls
(74) *Attorney, Agent, or Firm* — Lerner, David, Littenberg, Krumholz & Mentlik, LLP

(57) ABSTRACT

There is provided an electrode assembly comprising at least one stacked and folded type electrode stack in which a plurality of electrode units having electrode tabs are stacked in a state that the electrode units are separated by a sheet of separating film. The stacked and folded type electrode stack includes at least one stepped portion formed of electrode units having different areas and stacked on one another.

29 Claims, 25 Drawing Sheets

(51) Int. Cl.
*H01M 10/0583* (2010.01)
*H01M 10/0585* (2010.01)
*H01M 2/18* (2006.01)
*H01M 10/0587* (2010.01)
*H01M 10/052* (2010.01)
*H01M 2/22* (2006.01)

(56) References Cited

U.S. PATENT DOCUMENTS

| | | |
|---|---|---|
| 2001/0005561 A1 | 6/2001 | Yamada et al. |
| 2002/0160258 A1 | 10/2002 | Lee et al. |
| 2008/0280208 A1 | 11/2008 | Naoi et al. |
| 2010/0015511 A1 | 1/2010 | Yoo et al. |
| 2010/0167112 A1 | 7/2010 | Honda et al. |
| 2010/0190081 A1 | 7/2010 | Park et al. |
| 2011/0003208 A1* | 1/2011 | Hiraoka et al. .......... 429/231.95 |
| 2012/0110836 A1 | 5/2012 | Oh et al. |
| 2014/0011062 A1* | 1/2014 | Lee .................................. 429/94 |

FOREIGN PATENT DOCUMENTS

| | | |
|---|---|---|
| JP | 2001167743 A | 6/2001 |
| JP | 2003-523061 A | 7/2003 |
| JP | 2007324118 A | 12/2007 |
| KR | 20030066960 A | 8/2003 |
| KR | 20080030700 A | 4/2008 |
| KR | 20090120502 A | 11/2009 |
| KR | 20100118173 A | 11/2010 |
| KR | 20120039469 A | 4/2012 |
| WO | 01/59868 A1 | 8/2001 |
| WO | 2012/009423 A1 | 1/2012 |
| WO | 2013062661 A1 | 5/2013 |
| WO | 2013157743 A1 | 10/2013 |

OTHER PUBLICATIONS

Extended Search Report from European Application No. 13793522, dated Oct. 27, 2015.

\* cited by examiner

ELECTRODE ASSEMBLY HAVING STEPPED PORTION, AS WELL AS BATTERY CELL, BATTERY PACK, AND DEVICE INCLUDING THE ELECTRODE ASSEMBLY

CROSS-REFERENCE TO RELATED APPLICATIONS

The present application is a continuation of International Application No. PCT/KR2013/004620 filed May 27, 2013, which claims priority to Korean Patent Application Nos. 10-2012-0056326, filed on May 25, 2012, 10-2012-0127030, filed on Nov. 9, 2012, and 10-2013-0069029 filed on May 27, 2013, in the Korean Intellectual Property Office, the disclosures of which are incorporated herein by reference.

BACKGROUND OF THE INVENTION

1. Field of the Invention

The present invention relates to an electrode assembly, and more particularly, to an electrode assembly having a stepped portion formed by at least two electrode units having different sizes.

In addition, the present invention relates to a battery cell, a battery pack, as well as a device including the electrode assembly, and a method of manufacturing a battery including the electrode assembly.

2. Description of the Related Art

Demand for secondary batteries has markedly increased with the development and increasing usage of mobile devices, and particularly, lithium secondary batteries are widely used as power sources of various electronic products such as mobile devices owing to the high energy density, high operating voltage, easy-to-store characteristics, and long lifespan thereof.

Generally, lithium secondary batteries are formed by disposing an electrode assembly and an electrolyte in a battery case and sealing the battery case. Lithium second batteries may be classified into cylinder, prism, and pouch types according to the shapes thereof, and lithium ion batteries, lithium ion polymer batteries, and lithium polymer batteries according to the types of electrolytes.

Demand for thin prism or pouch type batteries increases as the size of mobile devices decreases, and particularly, pouch type batteries are noteworthy because pouch type batteries are light.

Electrode assemblies used in battery cases may be classified as jelly-roll (winding), stacked, and stacked and folded (combination) types according to the structures thereof.

A jelly-roll type electrode assembly may be formed by coating metal foil used as a current collector with electrode active materials, pressing the metal foil, cutting the metal foil into bands having a predetermined width and length, dividing the bands into positive and negative electrodes using a separator film, and spirally winding the separating film. A stacked type electrode assembly may be formed by vertically stacking a negative electrode, a separator, and a positive electrode. A combination type electrode assembly may formed by arranging a plurality of unit cells each including a stack of negative electrode/separator/positive electrode on a sheet of separating film and stacking the unit cells by folding the separating film.

Since electrode assemblies of the related art are generally manufactured by stacking unit cells or electrodes having the same size, it may be difficult to manufacture batteries having various designs using such electrode assemblies. Furthermore, if the designs of batteries are changed, processes such as electrode manufacturing processes, electrode stacking processes, or electric connection processes may become complicated or difficult to perform.

Since recent mobile devices have various shapes, it is necessary to manufacture batteries having various shapes for such mobile devices. Therefore, electrode assemblies having structures suitable for manufacturing batteries having various shapes or easily changing the shapes of batteries are necessary to follow or satisfy design requirements on recent (mobile) devices.

An aspect of the present invention provides an electrode assembly suitable for providing various battery designs.

An aspect of the present invention also provides an electrode assembly having a thin shape and satisfactory electric capacity characteristics.

Aspects of the present invention also provide a battery cell, a battery pack, and a device including the electrode assembly.

SUMMARY OF THE INVENTION

According to an aspect of the present invention, there is provided an electrode assembly including at least one stacked and folded type electrode stack in which a plurality of electrode units having electrode tabs are stacked in a state that the electrode units are separated by a sheet of separating film, wherein the stacked and folded type electrode stack includes at least one stepped portion formed of electrode units having different areas and stacked on one another with the sheet of separating film being disposed therebetween.

Mutually-facing electrodes of the electrode units having different areas may have different polarities.

The stacked and folded type electrode stack may be a Z-folded type electrode stack, and in this case, the stacked and folded type electrode stack may include one or two stepped portions.

A larger one of the mutually-facing electrodes of the electrode units having different areas may be a negative electrode.

Each of the electrode units may include one selected from the group consisting of positive electrodes, negative electrodes, and unit cells each having at least one positive electrode and at least one negative electrode that are stacked with a separator being disposed therebetween.

Each of the unit cells has a type selected from the group consisting of a jelly-roll type, a stacked type, a laminated and stacked type, and a stacked and folded type.

Unit cells having different areas and stacked on one another with a separator being disposed therebetween may include at least one stepped portion.

The separator may be a sheet of separating film, and the separating film may be bent or cut according to the shape of the stepped portion.

The stacked and folded type electrode stack may be a electrode stack in which a Z-folded type electrode stack is stacked together with a jelly-roll type electrode stack, a laminated and stacked type electrode stack, a stacked and folded type electrode stack, or a combination thereof by using the separating film.

The stacked and folded type electrode stack may be a Z-folded type electrode stack, and the electrode assembly may further include at least one selected from the group consisting of stacked type electrode stacks, jelly-roll type electrode stacks, laminated and stacked type electrode stacks, stacked and folded type electrode stacks, and combinations thereof, and at least one of the stacked type electrode stacks, the jelly-roll type electrode stacks, the laminated and stacked type electrode stacks, the stacked and folded type electrode stacks, and combinations thereof may include a stepped portion.

The electrode stack may include at least one electrode unit having at least one corner different in shape from the other corners thereof.

The electrode stack may include at least one electrode unit having at least one curved corner. For example, the electrode stack may include two or more electrode units each having at least one curved corner, and at least one of the two or more electrode units may have a curved corner different in curvature from curved corners of the other electrode units.

The electrode units may be stacked in the electrode stack in a manner such that areas of the electrode units decrease in a stacking direction thereof. The electrode units may be stacked in the electrode stack in a manner such that corners of the electrode units are aligned in a line. At least one of electrode units of the electrode stack adjoining each other with the separating film being disposed therebetween may be disposed within a boundary of the other electrode unit. The centers of the electrode units of the electrode stack may be aligned with each other.

The electrode units may have the same thickness or different thicknesses.

An outermost electrode of the electrode assembly may be a single-side-coated electrode having a non-coated side facing outward, and the separating film or a separator of the electrode assembly may be exposed. The single-side-coated electrode may be a positive electrode.

An outermost electrode of the electrode assembly may be a negative electrode, and the separating film or a separator of the electrode assembly may be exposed.

The electrode units may include electrode tabs corresponding to electrodes, respectively, and the electrode tabs may have the same size or different sizes.

According to another aspect of the present invention, there is provided a battery cell including: the electrode assembly; and a battery case accommodating the electrode assembly, and the battery case may be a lithium ion secondary battery cell or a lithium ion polymer secondary battery cell. The battery case may be a pouch type case. The battery case may be a stepped or inclined portion corresponding to the shape of the electrode assembly.

According to another aspect of the present invention, there is provided a device including at least one battery cell as described above. A system component of the device may be disposed in a remaining space of the battery cell. The device may be a cellular phone, a portable computer, a smartphone, a smartpad, a net book, an light electronic vehicle (LEV), an electric vehicle, a hybrid electric vehicle, a plug-in hybrid electric vehicle, or a power storage device.

According to an aspect of the present invention, electrode assemblies having stepped portions can be manufactured through a single process by a Z-folding method, and various battery designs can be provided using the electrode assemblies.

According to another aspect of the present invention, electrode assemblies can be manufactured using simply arranged unit cells through simple processes. In addition, electrode assemblies can be manufactured using unit cells in which positive and negative electrodes are assembled or using unit electrodes without having to form unit cells. Therefore, manufacturing processes can be further simplified.

According to another aspect of the present invention, electrode assemblies having stepped portions can be used to manufacture batteries so that devices using the batteries can have less dead space and high spatial efficiency. In addition, the capacities of the batteries can be increased.

According to another aspect of the present invention, in an electrode assembly, different types of electrodes can face each other in the interfacial regions between unit cells having different sizes. Therefore, an electrochemical reaction can occur in the interfacial regions to increase the output power of a battery.

Effects of the present invention are not limited to the above-mentioned effects. Those of skill in the art to which the present invention pertains will easily understand that various other effects can be obtained from the present invention described below.

DETAILED DESCRIPTION OF THE INVENTION

Figure 1A:
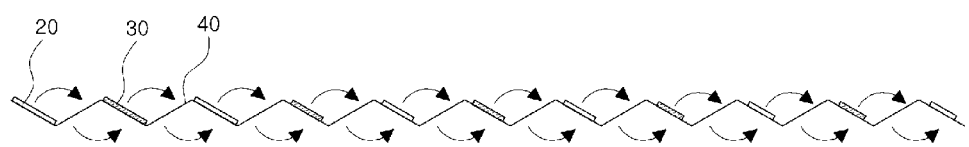
FIGS. 1A to 4B are developed views illustrating electrode units for forming electrode assemblies having stepped portions according to embodiments of the invention.

Hereinafter, embodiments of the invention will be described in detail with reference to the accompanying drawings. The drawings are attached hereto to help explain exemplary embodiments of the invention, and the present invention is not limited to the drawings and embodiments. In the drawings, some elements may be exaggerated, reduced in size, or omitted for clarity or conciseness.

Embodiments of the invention provide electrode assemblies having stepped portions. In the embodiments, the electrode assemblies may be formed by a stacked and folded method. For example, an electrode assembly may be formed by arranging electrode units on a separating film and folding the separating film in one direction (a winding type electrode assembly), or an electrode assembly may be formed by arranging electrode units on a sheet of separating film and folding the separating film in the form of a folding screen (a zigzag-folded (Z-folded) type electrode assembly). Examples of Z-folded type electrode assemblies are schematically illustrated in FIGS. 1 to 4. Hereinafter, Z-folded type electrode assemblies will be described in detail according to embodiments of the invention.

In the embodiments of the invention, each electrode assembly may be formed by combining electrode units having different areas. Each of the electrode units may include a unit cell having a negative electrode, a positive electrode, and a separator disposed between the negative and positive electrodes. An electrode assembly may be such an electrode unit or may be formed by combining such electrode units. In the description of the invention, the expression "different areas" may be used for the case where mutually-facing electrode units have different widths or lengths and thus mutually-facing electrodes of the electrode units have different areas.

The area difference of electrode units is not limited to a certain degree or range as long as the electrode units can form a stepped portion on an electrode assembly. For example, the width or length of a relatively small electrode unit may be 20% to 95% or 30% to 90% of the width or length of a relatively large electrode unit. Electrode units having different areas may have different widths or lengths, or may have different widths and lengths.

For example, a first electrode stack in which one or more electrode units having the same area are stacked may be prepared, and a second electrode stack in which one or more electrode units having a relatively small area may be disposed on top of the first electrode stack so as to form an electrode assembly. The numbers of the electrode units stacked in the first and second electrode stacks are not limited, and the heights of the first and second electrode stacks are not limited. In addition, the number of the electrode units of the first electrode stack may be equal to or different from the number of the electrode units of the second electrode stack, and the first and second electrode stacks may have the same height or different heights.

In the embodiments of the invention, the number of stepped portions of an electrode assembly is not limited. For example, an electrode assembly having two stepped portions may be formed by stacking electrode stacks having three different areas. In another example, an electrode assembly having a single stepped portion may be formed by stacking electrode stacks having two different areas. In another example, an electrode assembly having three or more stepped portions may be formed. In the following description, electrode assemblies each having two stepped portions will mainly be described as non-limiting examples.

In addition, electrode units (electrodes) of an electrode stack or different electrode stacks may have the same thickness or different thicknesses. For example, electrodes of an electrode unit having a relatively small area may be coated with a relatively large amount of an active material so as to compensate for the reduced amount of battery capacity due to the small area of the electrode unit. However, the present invention is not limited thereto. For example, an electrode unit having a relatively large area may have a relatively large or small thickness. That is, the thicknesses of electrode units are not limited. For example, those of skill in the art to which the present invention pertains may select proper thicknesses of electrode units after considering design specifications of batteries such as shapes, heights, and capacities determined according to the characteristics of devices with which the batteries will be used.

In the embodiments of the invention, materials used to form positive electrodes, negative electrodes, and separators of the electrode assemblies are not limited to particular materials. For example, materials generally used in the art to which the present invention pertains may be used.

Figure 5:
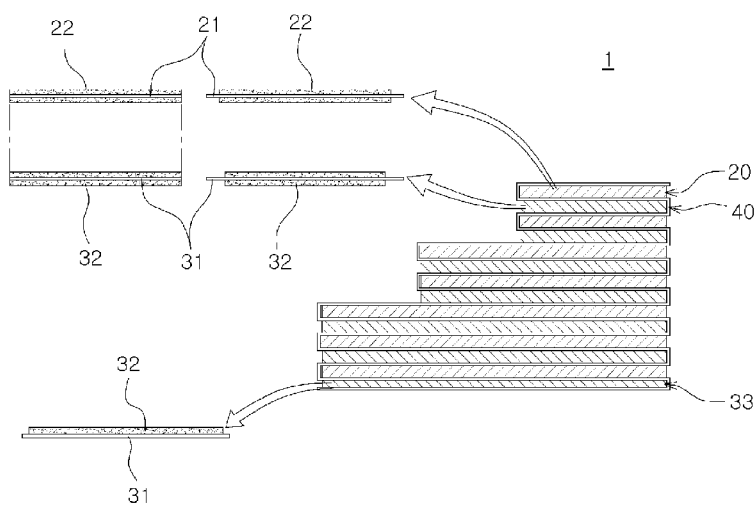
FIGS. 5 to 7 are schematic sectional views illustrating stack structures of electrode assemblies having stepped portions according to embodiments of the invention.

In the embodiments of the invention, electrode collectors of the negative and positive electrodes of the unit cells are coated with electrode active materials. Referring to FIG. 5, in each electrode unit, electrode collectors 21 and 31 of negative and positive electrodes 20 and 30 have the same size. The entire surfaces of the negative and positive electrode collectors 21 and 31 may be coated with negative and positive electrode active materials 21 and 31, or edge regions thereof may not be coated with negative and positive electrode active materials. If the entire surface of electrode collectors is coated with electrode active materials, negative and positive electrodes may have the same size. In this case, however, during a battery reaction, lithium may precipitate from a positive active material to lower the performance of a battery. Therefore, in some cases, the area of a positive electrode coated with a positive electrode active material may be smaller than the area of a negative electrode coated with a negative electrode active material so as to prevent the precipitation of lithium from the positive active material.

In the embodiments of the invention, negative and positive electrodes may be formed of any materials generally used in the related art for forming negative and positive electrodes. For example, negative electrodes may be fabricated by making a negative electrode collector using copper, nickel, aluminum, or a combination thereof and coating one or both sides of the negative electrode collector with at least one negative electrode active material selected from lithium, a lithium alloy, carbon, petroleum coke, active carbon, graphite, a silicon compound, a zinc compound, a titanium compound, and alloys or combinations thereof. However, the present invention is not limited thereto. Positive electrodes may be fabricated by making a positive electrode collector using aluminum, nickel, or an alloy or combination thereof and coating one or both sides of the positive electrode collector with a positive electrode active material such as a lithium manganese oxide, a lithium cobalt oxide, a lithium nickel oxide, a lithium iron phosphate, or a combination or complex oxide thereof.

At this time, electrode collectors of electrodes may be coated with the same amount or different amounts of electrode active materials so that the electrodes can have the same thickness or different thicknesses. In addition, both sides of an electrode collector may be coated with different amount of an active material, or one of both sides of an electrode collector may not be coated with an active material.

In addition, each of separators may be a multilayer film formed of a material having fine pores such as polyethylene, polypropylene, or a combination thereof. In another example, each of the separators may be a polymer film for a solid or gel-type polymer electrolyte, such as a polyvinylidenefluoride, a polyethylene oxide, a polyacrylonitrile, or a polyvinylidenefluoride-co-hexafluoropropylene film. In the embodiments of the invention, sheets of separating film formed of the same material used to form separators may be used.

FIGS. 1A to 4B are developed views illustrating examples of the above-described electrode stacks formed by arranging electrode units on a sheet of separating film and folding the separating film in a zigzag manner (Z-folded type). FIGS. 1A to 4B are developed views illustrating exemplary electrode stacks that can be used to form electrode assemblies having stepped portions, and those of skill in the related art could easily modify the exemplary electrode stacks to form various electrode assemblies within the scope and spirit of the present invention. Although a single sheet of separating film is used in the examples shown in FIGS. 1A to 4B, it will be apparent to those of skill in the related art that two or more sheets of separating film can be used to form an electrode stack. For example, an electrode stack (electrode assembly) may be formed by arranging two sheets of separating film in parallel, disposing electrode units on at least one of the two sheets of separating film between the two sheets of separating film, and folding the sheets of separating film.

In embodiments of the invention, an electrode unit may include one selected from the group consisting of negative electrodes, positive electrode, and unit cells each having negative and positive electrodes that are stacked with a separator being disposed therebetween, and an electrode stack may be a structure in which at least two such electrode units are stacked with a separator or a sheet of separating film being disposed therebetween. Alternatively, an electrode stack may be one unit cell in which at least two electrodes are stacked or may be a combination of at least one unit cell and at least one electrode. That is, in embodiments of the invention, the terms "unit cell" and "electrode stack" may be interchangeably used. In addition, an electrode assembly may be formed of one electrode stack, at least two electrode stacks, or a combination of at least one electrode stack and at least one single electrode. Therefore, in the following description, an electrode stack may be one of basic structures forming an electrode assembly, or an electrode stack may be an electrode assembly. That is, the number of electrode stacks included in an electrode assembly is not limited.

Figure 1B:
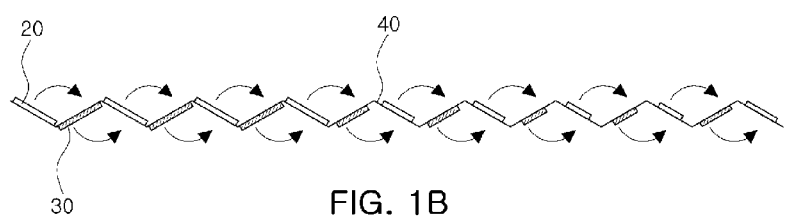

Referring to FIGS. 1A and 1B, negative electrodes 20 and positive electrodes 30 may be arranged on a sheet of separating film 40, and the separating film 40 may be folded in a zigzag manner to form an electrode stack having a stepped portion. Referring to FIG. 1A, electrode units each including a negative electrodes 20 and a positive electrodes 30 are arranged on a side of a sheet of separating film 40 in a manner such that the negative and positive electrodes 20 and 30 are alternately arranged at regular intervals, and the separating film 40 is folded in a Z-folding manner. Referring to FIG. 1B, negative electrodes 20 and positive electrodes 30 are arranged on both sides of a sheet of separating film 40 to form an electrode stack. In detail, the negative electrodes 20 are arranged on a side of the separating film 40 at regular intervals, and the positive electrodes 30 are arranged on the other side of the separating film 40 at regular intervals. Then, the separating film 40 is folded in a Z-folding manner to form an electrode stack.

Figure 2A:
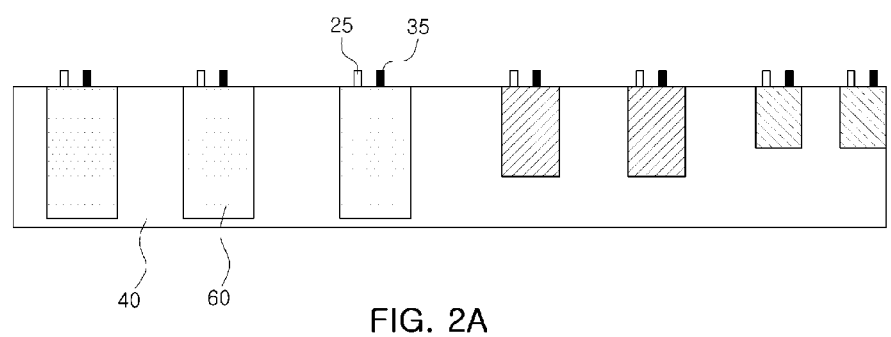
Figure 2B:
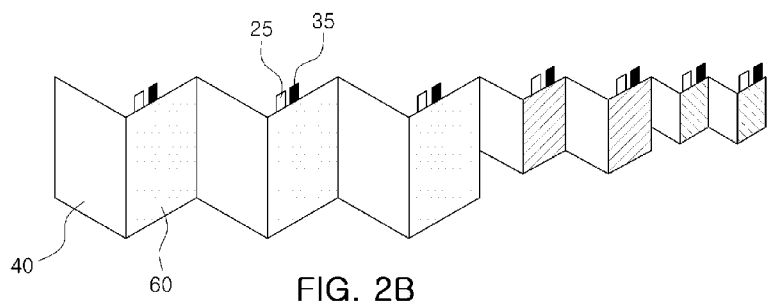

In addition, as shown in FIGS. 2A to 4B, an electrode stack may be formed by a Z-folding method using unit cells 60 in which negative electrodes 20 and positive electrodes 30 are stacked with separators 50 being disposed therebetween. In detail, FIGS. 2A and 2B are developed views for illustrating a method of forming an electrode assembly by arranging unit cells 60 having different areas on a side of a sheet of separating film and folding the separating film in a Z-folding manner. Each of the unit cells 60 may be a full cell in which a negative electrode 20 and a positive electrode 30 are stacked with a separator being disposed therebetween, or may be a bi-cell in which negative and positive electrodes 20 and 30 are alternately stacked with separators 50 being disposed therebetween. Electrodes having the same polarity are disposed on both sides of such a bi-cell. Examples of full cells and bi-cells are illustrated in FIGS. 3A to 4B.

Figure 3A:
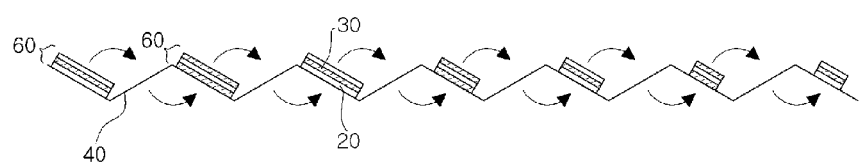
Figure 3B:
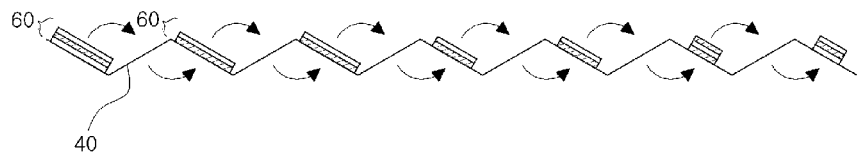

FIGS. 3A and 3B are developed views illustrating bi-cells (A-type bi-cells and C-type bi-cells) arranged on sheets of separating film 40. In each A-type bi-cell, a negative electrode 20 is disposed between two positive electrodes 30 with separators 50 being disposed therebetween. In each C-type bi-cell, a positive electrode is disposed between two negative electrodes 20 with separators 50 being disposed therebetween. FIG. 3A is a developed view for forming an electrode stack by arranging electrode units (cells) on a side of a sheet of separating film 40 and folding the separating film 40 in a Z-folding manner, and FIG. 3B is a developed view for forming an electrode stack by arranging electrode units (cells) on both sides of a sheet of separating film 40 and folding the separating film 40 in a Z-folding manner.

Figure 4A:
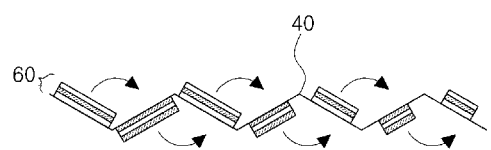
Figure 4B:
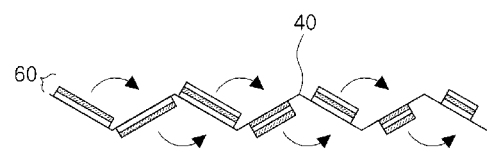

FIGS. 4A and 4B are developed views illustrating bi-cells and full cells arranged on sheets of separating film 40. In detail, FIG. 4A is a developed view for forming an electrode stack by arranging electrode units (cells) on a side of a sheet of separating film 40 and folding the separating film 40 in a Z-folding manner, and FIG. 4B is a developed view for forming an electrode stack by arranging electrode units (cells) on both sides of a sheet of separating film 40 and folding the separating film 40 in a Z-folding manner.

Referring to the embodiments shown in FIGS. 2A to 4B, full cells and bi-cells are arranged on a sheet of separating film 40. In addition to this, electrodes may also be arranged as electrode units on the separating film 40. Furthermore, various unit cells 60 such as a unit cell in which at least two negative electrodes 20 and at least two positive electrodes 30 are stacked with separators 50 being disposed therebetween may also be arranged on the separating film 40. That is, electrode units may be arranged on the separating film 40 in various manners as well as the manners illustrated in FIGS. 2A to 4B.

Figure 6:
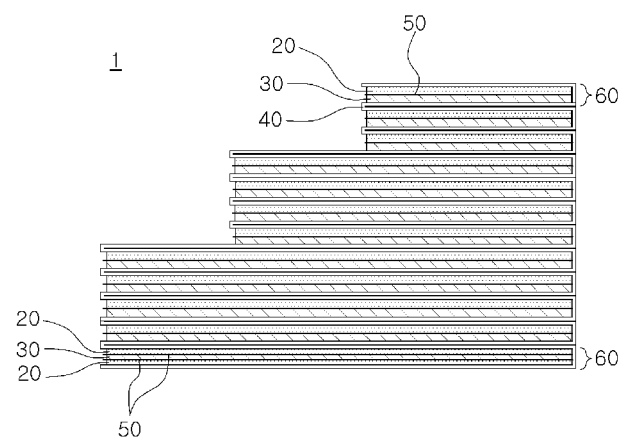
Figure 7:
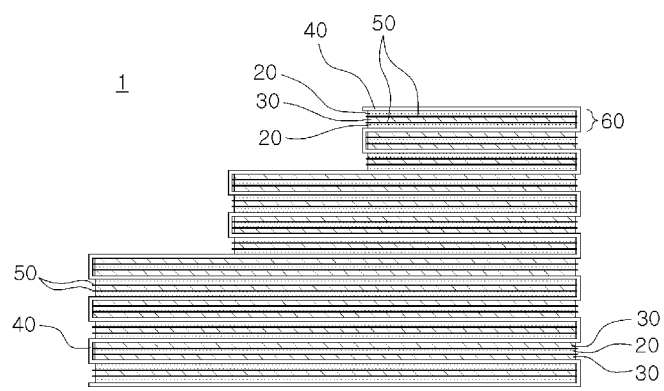

FIGS. 5 to 7 illustrate exemplary stack structures of electrode assemblies 1 formed by arranging electrode units on a sheet of separating film 40 and folding the separating film 40 in a Z-folding manner as explained with reference to FIGS. 2A to 4B. In detail, FIG. 5 illustrates an electrode assembly 1 having stepped portions (stepped electrode assembly) formed by arranging single electrodes on both sides of a sheet of separating film 40 and folding the separating film 40 in a Z-folding manner as illustrated in FIG. 1B. FIG. 6 illustrates a stepped electrode assembly 1 formed by arranging full cells and bi-cells having different areas as electrode units on a side of a sheet of separating film 40 and folding the separating film 40 in a Z-folding manner as illustrated in FIG. 3A or 4A. FIG. 7 illustrates a stepped electrode assembly 1 formed by arranging bi-cells having different areas on a side of a sheet of separating film 40 and folding the separating film 40 in a Z-folding manner.

In embodiments of the invention, electrode units having different areas may be stacked to form a stepped portion therebetween. At this time, electrodes of the electrode units facing each other with a separating film being disposed therebetween may have different polarities. If electrodes having the same polarity face each other with a separating film being disposed therebetween, a battery reaction may not occur between the mutually-facing electrodes. However, electrodes having different polarities face each other, a battery reaction may occur between the mutually-facing electrodes so that the reaction area and capacity of a battery can be increased without increasing the size thereof.

Specifically, when electrode units having different areas are stacked, a larger one of mutually-facing electrodes of the electrode units may be a negative electrode. In detail, if electrode units of an electrode assembly having different areas face each other with a separating film being disposed therebetween, a larger one of mutually-facing electrodes of the electrode units is partially exposed to the outside in a state that the larger electrode is covered with the separating film. In this case, the larger electrode may be a negative electrode. Since positive electrodes are coated with a positive electrode active material including lithium, if a positive electrode is exposed, lithium may precipitate from the positive electrode to decrease the lifespan or stability of a battery.

Due to the same reason, as shown in FIGS. 1, 3, and 4, electrode units may be arranged on a separating film in a manner such that a negative electrode 20 can be disposed on at least one side of an electrode assembly 1. Referring to FIGS. 5 to 7, a negative electrode 20 is disposed on a side of an electrode assembly 1, or negative electrodes 20 are disposed on both sides of an electrode assembly 1.

In some embodiments of the invention, as shown in FIG. 5, a positive electrode 30 may be disposed on a side of an electrode assembly 1. In this case, however, the positive electrode 30 may be a single-side-coated positive electrode 33 having an outer side not coated with a positive electrode active material 32. Referring to FIG. 5, a positive electrode 30 is disposed on the bottom side of the electrode assembly 1, and the bottom side of the positive electrode 30 is not coated with a positive electrode active material. The outermost electrodes of the electrode assembly 1 may be covered with separators or a sheet of separating film to prevent the outermost electrodes from being directly exposed to the outside.

In embodiments of the invention, unit cells or electrode units are not limited to particular structures or types. For example, unit cells in which negative and positive electrodes are alternately stacked with separators being disposed therebetween may be used to form a stacked type electrode stack.

According to other embodiments of the invention, in addition to the above-mentioned methods, laminations each including at least one positive electrode and at least one separator may be formed as unit cells, and the unit cells may be stacked to form an electrode stack (this method will now be referred to as a laminated and stacked type or a lamination and stacking method). That is, in embodiments of the invention, electrode stacks or electrode assemblies may be manufactured by the above-mentioned methods or the lamination and stacking method.

In the case that an electrode stack is formed by the lamination and stacking method, the structure of each unit cell of the electrode stack is not limited to a particular structure as long as each unit cell includes at least one positive electrode, at least one negative electrical, and at least one separator.

However, for a simple and economical manufacturing process, each unit cell of an electrode stack formed by the lamination and stacking method may have a basic structure of negative electrode/separator/positive electrode/separator or separator/negative electrode/separator/positive electrode. In some embodiments, each unit cell may include one or more basic structures.

Furthermore, an electrode stack formed by the lamination and stacking method may only include electrode units having the above-mentioned basic structure or may include electrode units having the above-mentioned basic structure and other electrode units having a different structure(s).

Figure 13:
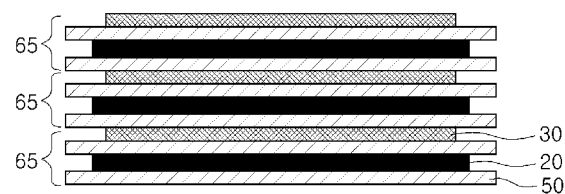
FIGS. 13 to 15 are schematic views illustrating exemplary laminated and stacked type unit cells used as unit cells according to embodiments of the invention.
Figure 14:
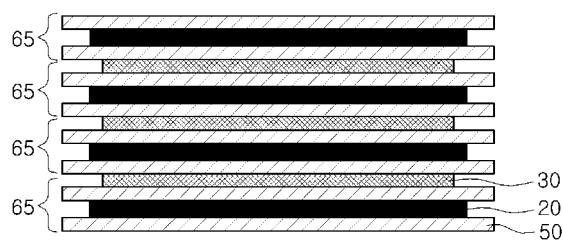
Figure 15:
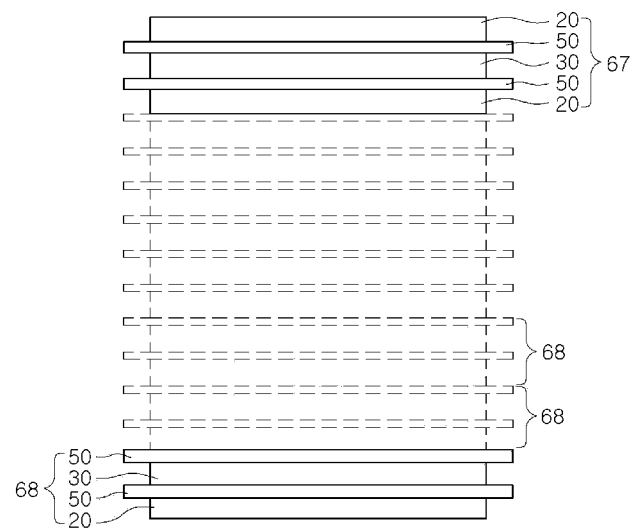

FIGS. 13 to 15 illustrate various examples of electrode stacks formed by a lamination and stacking method.

FIG. 13 illustrates an electrode stack including electrode units 65 formed by a lamination and stacking method. Each of the electrode units 65 has a basic structure of separator 50/negative electrode 20/separator 50/positive electrode 30. Instead of the basic structure of separator/negative electrode/separator/positive electrode illustrated in FIG. 13, each of the electrode units 65 may have a basic structure of separator/positive electrode/separator/negative electrode (the positions of negative and positive electrodes are changed). If the basic structure of an electrode unit is a separator/negative electrode/separator/positive electrode structure as illustrated in FIG. 13, the outermost (uppermost) positive electrode of the electrode stack formed of such electrode units may be not covered with a separator but may be exposed to the outside. In this case, the outermost positive electrode may be a single-side-coated positive electrode whose exposed side is not coated with an active material so as to optimize the capacity of a battery or the design of electrode units. Although each of the electrode units 65 illustrated in FIG. 13 has the same basic structure, the present invention is not limited thereto. For example, electrode units each having two or more identical or different basic structures may be stacked to form an electrode stack.

FIG. 14 illustrates an electrode stack formed by stacking electrode units 66 having a basic structure of separator 50/negative electrode 20/separator 50/positive electrode 20 and an electrode unit having a basic structure of separator 50/negative electrode 20/separator 50. In FIG. 14, since the outermost (uppermost) electrode unit has a basic structure of separator 50/negative electrode 20/separator 50, a positive electrode may not be exposed, and the capacity of a battery may be increased. Similarly, in the case of an electrode stack having an exposed uppermost negative electrode, an electrode unit having a basic structure of separator/positive electrode/separator may be disposed on the exposed uppermost negative electrode to maximally use the capacity of the uppermost negative electrode.

FIG. 15 illustrates an electrode stack formed by stacking electrode units 68 having a basic structure of negative electrode 20/separator 50/positive electrode 30/separator 50 and an electrode unit 67 having a basic structure of negative electrode 20/separator 50/positive electrode 30/separator 50/negative electrode 20. In FIG. 15, since the outermost (uppermost) electrode unit has a basic structure of negative electrode 20/separator 50/positive electrode 30/separator 50/negative electrode 20, a positive electrode may not be exposed, and the capacity of a battery may be increased.

As illustrated in FIGS. 14 and 15, the electrode stacks formed by a lamination and stacking method include electrode units having the above-described basic structures. In addition to the electrode units, the electrode stacks may further include a single electrode, a single separator, or unit cells having different arrangements and structures. For example, after stacking electrode units having the above-described basic structures, a single electrode, a single-side-coated electrode, a separator, or a unit cell having a different arrangement and structure may be disposed on an outermost side or both the outermost sides of the stacked electrode units so as to cover an exposed positive electrode or increase the capacity of a battery. In the electrode stacks illustrated in FIGS. 14 and 15, the uppermost electrode units have structures different from those of the other electrode units. However, the present invention is not limited thereto. For example, the lowermost electrode unit of an electrode stack may have a structure different from the structure of the other electrode units of the electrode stack, or the uppermost and lowermost electrode units of an electrode stack may have a structure different from the structure of the other electrode units of the electrode stack.

In some embodiments of the invention, an electrode stack may be a stacked and folded type electrode stack formed as follows: negative and positive electrodes are arranged on a sheet of separating film or electrode stacks each including at least one negative electrode, at least one positive electrode, and a separator disposed between the negative and positive electrodes are arranged on a sheet of separating film; and the separating film is folded.

The stacked and folded type electrode stack may be a winding type electrode stack formed by folding the separating film in one direction or may be a Z-folded type electrode stack formed by folding the separating film in a zigzag manner (Z-folding manner). The winding direction of the winding type electrode stack may be changed from clockwise to counterclockwise or from counterclockwise to clockwise. For example, the winding direction of a winding type unit cell 71 may be changed like the winding direction of jelly-roll type unit cells 73 shown in FIG. 11. In another example, the winding direction of a winding type unit cell may be changed like the winding direction of jelly-roll type unit cells 73 shown in FIG. 12.

In some embodiments of the invention, an electrode stack may be a jelly-roll type electrode stack formed by rolling up at least one rectangular negative electrode sheet, a sheet of separating film, and at least one rectangular positive electrode sheet in a spiral form. In some embodiments of the invention, an electrode assembly having a stepped portion may be manufactured by forming a Z-folded type electrode stack and continuously forming a jelly-roll type electrode stack or a stacked and folded type electrode stack by using a single sheet of separating film.

In embodiments of the invention, an electrode assembly may be a Z-folded type electrode assembly formed by combining electrode stacks of different types or electrode stacks of the same type. In addition, other electrode units such as single electrodes may be stacked together with such electrode stacks to form an electrode assembly.

For example, according to an embodiment, a Z-folded type electrode assembly may be formed as follows: one or more of stacked type electrode stacks, laminated and stacked type electrode stacks, stacked and folded type electrode stacks, and jelly-roll type electrode stacks are arranged as unit cells on a side or both sides of a sheet of separating film; and the separating film is folded in a Z-folding manner. At this time, unit cells facing each other with a separator being disposed therebetween may have different areas to form a stepped portion.

Figure 8:
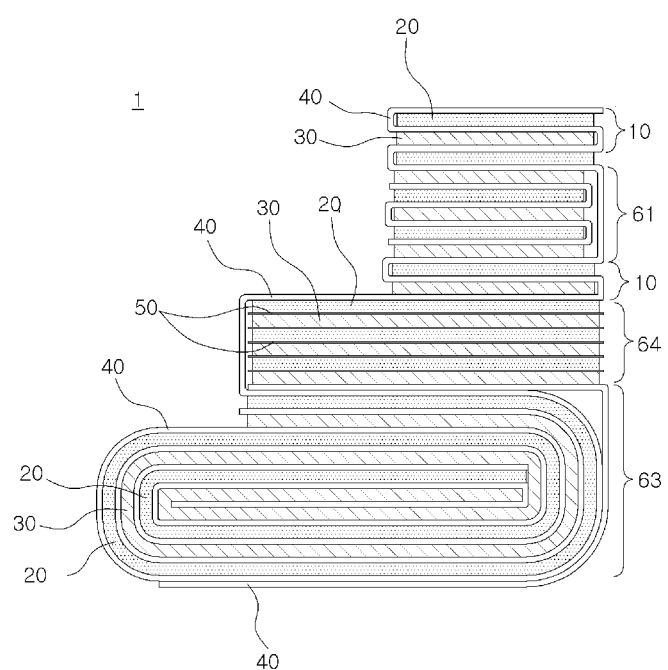
FIGS. 8 to 12 are schematic sectional views illustrating stack structures of electrode assemblies having stepped portions according to other embodiments of the invention.

An exemplary electrode assembly including such electrode stacks as unit cells (electrode units) is illustrated in FIG. 8. Referring to FIG. 8, a stepped electrode assembly 1 includes: a jelly-roll type unit cell 73 as a large area unit cell; a stacked type electrode stack 74 as a intermediate area unit cell; and a stacked and folded type (Z-folded type) electrode stack 76 and single electrodes 10 as a small area unit cell. The unit cells are stacked using a Z-folding method using a sheet of separating film 40. However, an electrode assembly having a structure different from the structure shown in FIG. 8 may be formed.

In some embodiments of the invention, some or all electrode units of an electrode assembly may be wound using a sheet of separating film. Although not shown in FIG. 8, an electrode stack 70 used as a unit cell may have a stepped portion.

Figure 9:
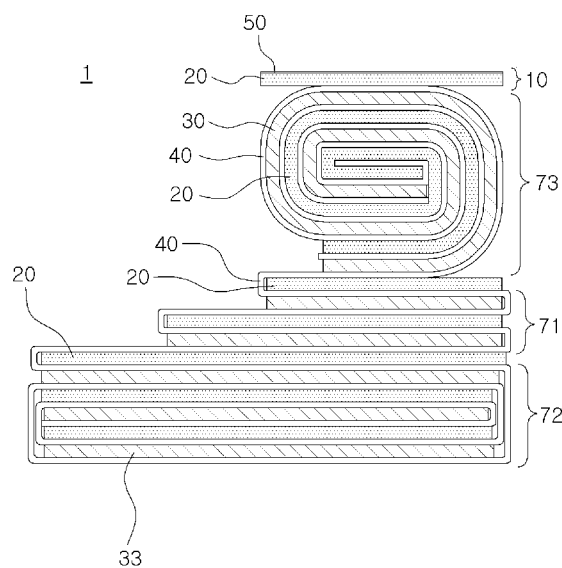

In some embodiments of the invention, an electrode assembly may include a Z-folded type electrode unit, a winding type electrode unit, and a jelly-roll type electrode unit that are formed using a single sheet of separating film. An example of the electrode assembly is illustrated in FIG. 9. Referring to FIG. 9, a stepped electrode assembly 1 includes: a stacked and folded type (winding type) electrode stack 72 as a large area electrode unit; a stacked and folded type (Z-folded type) 71 electrode stack as a intermediate area electrode unit; and a jelly-roll type electrode stack 73 as a small area electrode unit that are formed using a single sheet of separating film 40. The stepped electrode assembly 1 of FIG. 9 is formed using a shingle sheet of separating film 40. Unlike that, the electrode assembly 1 may be formed using sheets of separating film 40 connected in series.

In addition, referring to FIG. 9, a single electrode 10 (negative electrode 20) whose outer side is covered with a separator 50 is disposed on the topside of the electrode assembly 1. Since a positive electrode 30 of the jelly-roll type electrode unit (unit cell) 60 covered with the separating film 40 is located on the topside of the electrode assembly 1, the single electrode 10 (negative electrode 20) is additionally disposed on the topside of the electrode assembly 1 so that the uppermost electrode be a negative electrode. In addition, a single-side-coated positive electrode 33 having a non-coated side on a bottom side thereof is disposed on the bottom side of the electrode assembly 1 of FIG. 9.

In embodiments of the invention, an electrode assembly may include another type of electrode stack as an electrode unit as well as a Z-folded type electrode stack. For example, an electrode assembly may include a stacked type electrode stack, a jelly-roll type electrode stack, or a stacked and folded type electrode stack, as well as a Z-folded type electrode stack. At this time, the electrode assembly may include at least one type of electrode stack. For example, the electrode assembly may include at least two electrode stacks of the same type. At least one of the above-listed electrode stacks may include a stepped portion, or a stepped portion may be formed by combination of the electrode stacks. In addition, the electrode assembly may further include a single electrode. If necessary, the electrode units or the single electrode of the electrode assembly may be stacked with a separator being disposed therebetween.

Figure 10:
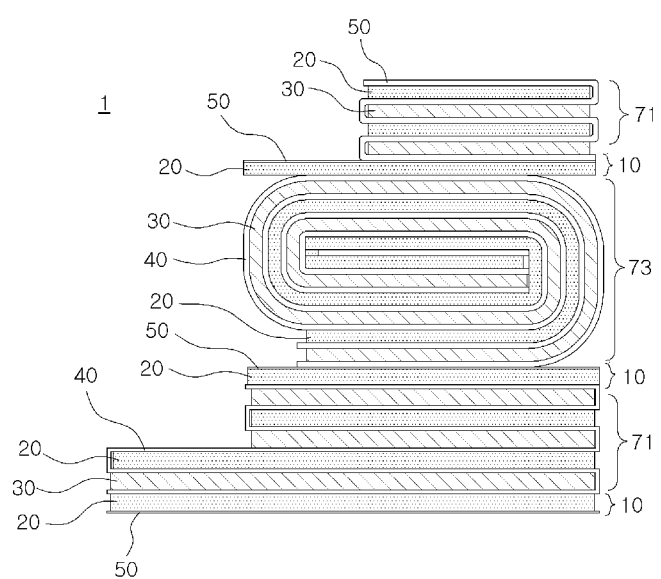

FIG. 10 illustrates an example of the above-described electrode assembly. Referring to FIG. 10, an electrode assembly 1 includes: a single electrode 10 as a large area electrode unit; a Z-folded type electrode stack having a stepped portion formed by a large area electrode unit and a intermediate area electrode unit; and a combination of a single electrode 10 and a jelly-roll type electrode stack 73 as a intermediate area electrode unit; and a Z-folded type unit cell 71 as a small area electrode unit.

Figure 11:
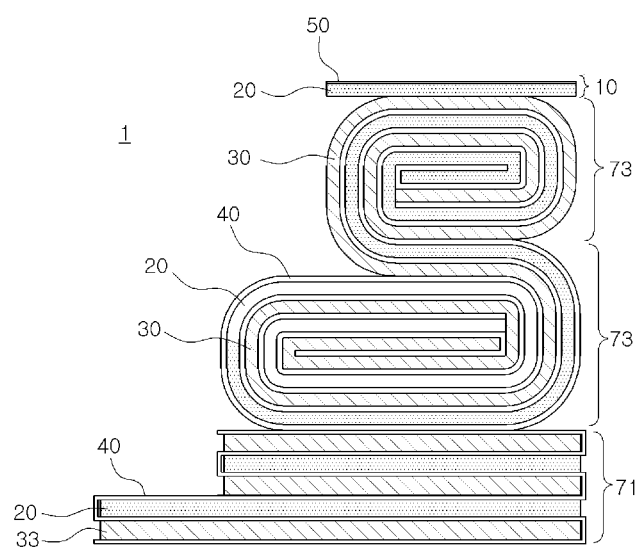
Figure 12:
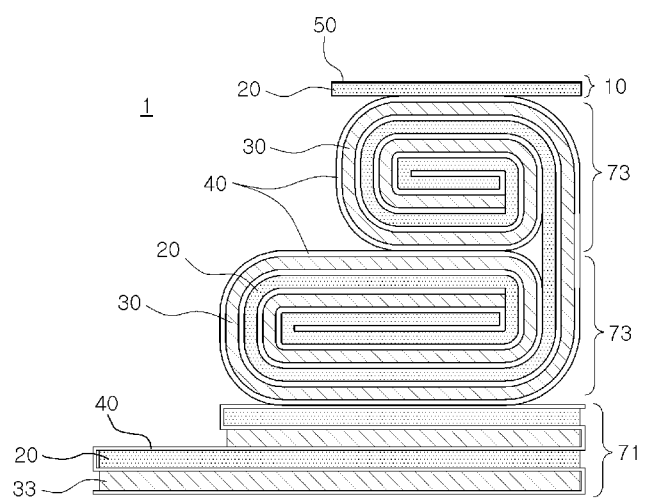

FIGS. 11 and 12 illustrate exemplary electrode assemblies having stepped portions formed by a plurality of electrode stacks. The electrode assemblies illustrated in FIGS. 11 and 12 have the same structure except for the winding directions of jelly-roll type electrode stacks 73. Referring to FIG. 11, a intermediate area jelly-roll type electrode stack 73 and a large area jelly-roll type electrode stack 73 are formed by rolling up the same sheet of separating film in clockwise and counter-clockwise directions, respectively, and the jelly-roll type electrode stacks (unit cells) 73 are stacked. Referring to FIGS. 11 and 12, each of electrode assemblies 1 include: a Z-folded type electrode stack 71 having a stepped portion between large and intermediate areas; jelly-roll type unit cells (electrode stacks) 63 having a stepped portion between intermediate and small areas; and a single electrode 10 as a small area electrode unit. The jelly-roll type unit cells shown in FIGS. 11 and 12 can be replaced with stacked and folded type (winding type) unit cells wounded (rolled) in the same manner.

Figure 16A:
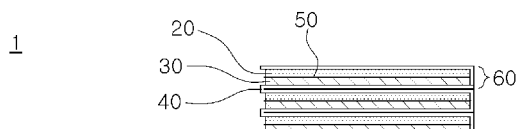
FIGS. 16A to 16C are schematic views illustrating exemplary electrode assemblies each having a single stepped portion according to embodiments of the invention.
Figure 16A:
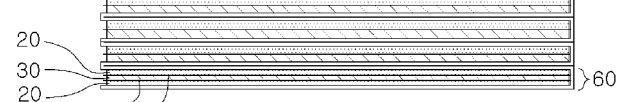
Figure 16B:
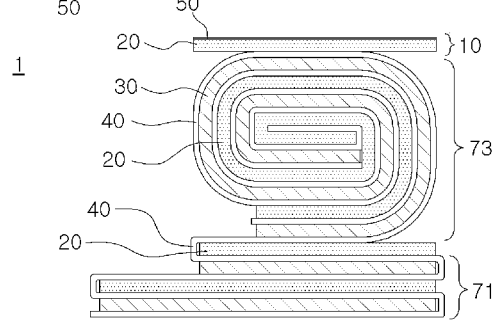
Figure 16C:
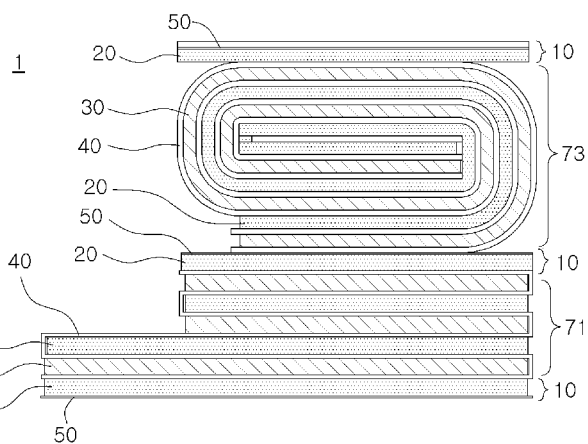

In the above description, electrode assemblies each having two stepped portions are described with reference to the accompanying drawings. However, an electrode assembly having a stepped portion may be formed by stacking two electrode stacks. Examples thereof are illustrated in FIGS. 16A to 16C.

Figure 17A:
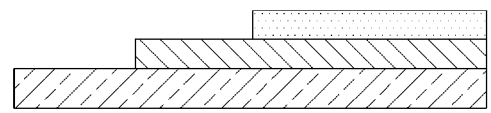
FIGS. 17A to 17C are schematic sectional views illustrating electrode assemblies having stepped portions according to embodiments of the invention.
Figure 17B:
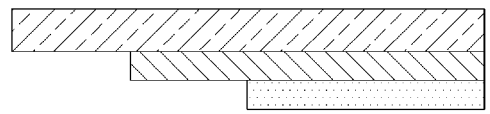
Figure 17C:
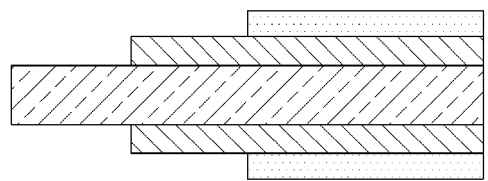

In embodiments of the invention, electrode assemblies may have various stack structures. FIGS. 16A to 16C are schematic cross-sectional views illustrating stack structures of electrode assemblies. As illustrated in FIGS. 17A to 17C, the sizes of electrode units stacked in an electrode assembly may decrease upwardly (FIG. 17A) or downwardly (FIG. 17B). In addition, the sizes of electrode units may increase and then decrease in a stacking direction (FIG. 17C) or may decrease and then increase in a stacking direction. In this case, the electrode units may be symmetrically stacked. In other embodiments of the invention, the sizes of stacked electrode units may vary randomly.

Figure 18:
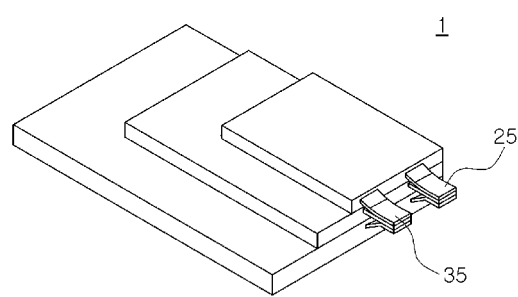
FIGS. 18 to 24 are perspective views illustrating battery cells having stepped portions according to embodiments of the invention.
Figure 19:
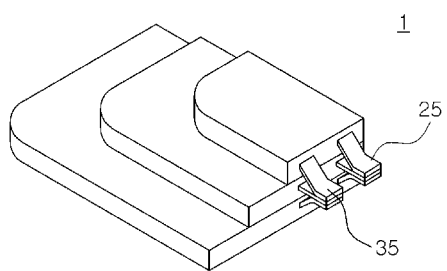
Figure 20:
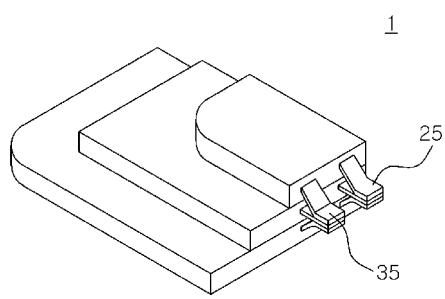
Figure 21:
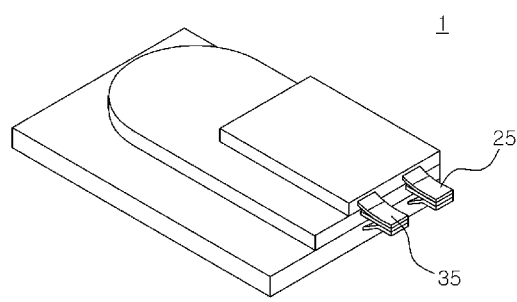
Figure 22:
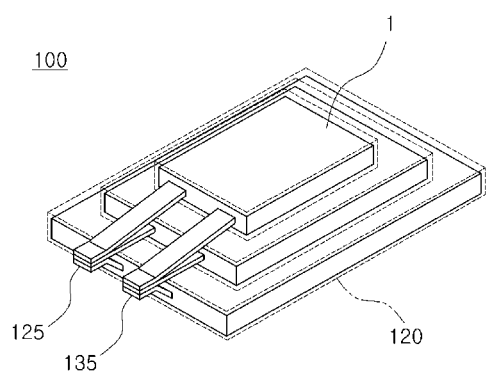

In addition, as illustrated in FIGS. 18 to 22, corners of electrode units may be aligned in a line. At this time, the electrode units may have different areas but the same shape as shown in FIGS. 18 and 18, or may have different areas and shapes as shown in FIGS. 20 to 22.

For example, at least one of electrode units may have a curved corner as illustrated in FIGS. 20 and 21. In another example, at least one of electrode units may have at least two curved corners. Corners of electrode units may have various shapes, and this is the same in the following description.

As shown in FIG. 20, corners of electrode units may have different degrees of curvature, and as shown in FIG. 21, corners of electrode units may have different shapes. In addition, as shown in FIG. 22, a side and two neighboring corners of an electrode unit may form an arc.

Figure 23:
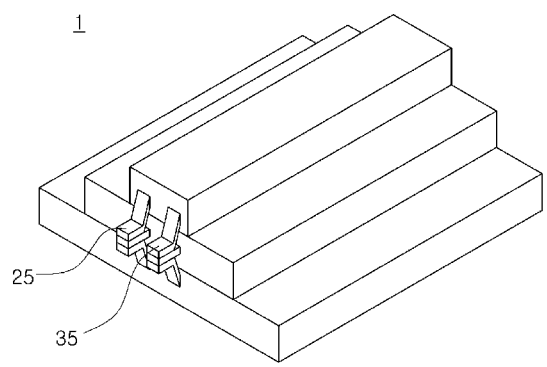

Furthermore, electrode units may be stacked in a manner such that a relatively small electrode unit is within the boundary of a relatively large electrode unit. At this time, the electrode units may be stacked in a random manner. FIG. 23 illustrates electrode units stacked with centers thereof being aligned with each other.

Figure 24:
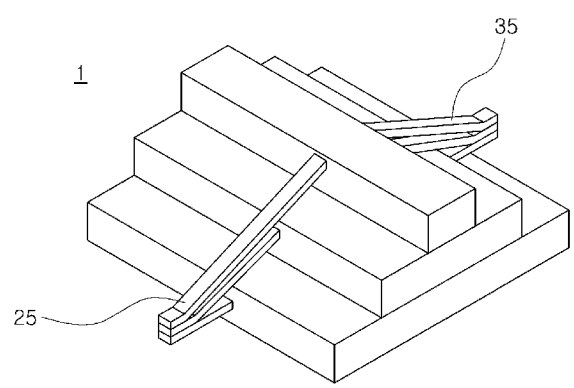
Figure 25A:
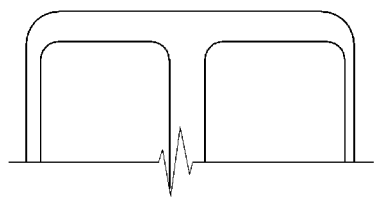
FIGS. 25A and 25B are a plan view and a front view illustrating stacked structure of electrode taps according to an embodiment of the invention.
Figure 25B:
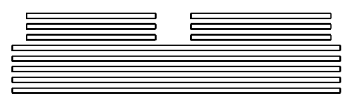

In addition, as illustrated in FIG. 24, an electrode assembly 1 having stepped portions in the width direction thereof may be formed by stacking unit cells having the same length but different widths. In this case, the stepped portions may be formed on a side or both sides in the width direction of the electrode assembly 1. In another embodiment illustrated in FIG. 25, an electrode assembly 1 may have stepped portions in the length direction thereof.

In addition to structures shown in the drawings, corners of electrode units may have various other shapes. As described above, electrode units may be stacked in a manner such that a relatively small unit cell is within the boundary of a relatively large unit cell. In other embodiments, however, electrode units may be stacked in a manner such that two neighboring unit cells are partially in contact with each other to form, for example, a cross (+) shape.

According to embodiments of the invention, electrode assemblies 1 having various stack structures, electrode unit shapes, and corner shapes can be provided to form batteries having various designs and to improve efficiency in space utilization.

In embodiments of the invention, electrode units of electrode assemblies include negative electrode tabs and/or positive electrode tabs. If an electrode unit is a unit cell, the electrode unit may have both negative and positive electrode tabs, and if an electrode unit is an electrode, the electrode unit may have an electrode tab. After the unit cells are inserted in a battery case, the electrode tabs of the same polarity are electrically connected to each other.

The negative and positive electrode tabs may be attached to various positions. For example, the negative and positive electrode tabs may be attached to the same sides of electrode units and superimposed on one another according to polarities thereof. For example, as shown in FIGS. 18 to 25, electrode tabs 25 and 35 may protrude from a side of each of electrode assemblies 1. In another example, electrode tabs 25 and 35 may protrude from both lateral sides of an electrode assembly 1 as shown in FIG. 24.

In both the examples, electrode tabs of the same polarity may be superimposed on one another so that the electrode tabs of the same polarity can easily be electrically connected after being inserted in a battery case.

If electrode tabs 25 and 35 are formed on stepped sides of an electrode assembly 1 as shown in FIG. 22 or 24, electrode tabs 25 and 35 protruding from a relatively small electrode unit may make contact with an electrode of a relatively large electrode unit, to deteriorate the stability of a battery. To prevent this, the electrode tabs 25 and 35 may be coated with an insulation resin or insulation tape.

The shapes and sizes of the electrode tabs are not limited. For example, the electrode tabs may have the same width and length, or different widths and/or lengths. In this case, the electrode tabs may easily be superimposed on one another by placing a relatively small electrode tab on a relatively large electrode tab. For example, if the electrode tabs have different sizes, electrode tabs having the same polarity may be stacked on one another as shown in FIG. 22.

In the case that some or all of electrode units are folded using at least one sheet of separating film to form an electrode assembly, the separating film may have an inclined portion between an upper edge of a relatively large electrode unit and an upper edge of a relatively small unit cell. Particularly, when a separating film is used to form a stacked and folded type (winding type) electrode assembly having a stepped portion or used to wrap an electrode assembly having a stepped portion, the separating film may have an inclined portion.

In this case, an electrode case used to accommodate an electrode assembly may have an inclined portion corresponding to the inclined portion of the separating film. However, this may increase the size of the electrode case. To prevent this, the separating film may be shaped according to the shape of an electrode assembly for increasing the spatial efficiency of a battery. For example, if a portion of a separating film is spaced apart from an electrode assembly, the portion of the separating film may be stretched by heating or pressing according to the shape of the electrode assembly. That is, the separating film may be bent or curved at a stepped portion of the electrode assembly. Alternatively, the separating film may be shaped according to the shape of the electrode assembly by cutting the separating film along a stepped portion of the electrode assembly.

Next, battery cells will be described according to embodiments of the invention. FIG. 23 illustrates an exe' battery cell 100 according to an embodiment of the invention. Referring to FIG. 23, the battery cell 100 includes a battery case 120 and an electrode assembly 1 disposed in the battery case 120. The battery case 120 may be a pouch type case.

The pouch type case may be formed of a laminate sheet including an outer resin layer, a blocking metal layer for preventing permeation of foreign substances, and an inner sealing resin layer. However, the pouch type case is not limited thereto.

Electrode leads for connecting electrode terminals (tabs) of electrode units of the electrode assembly may be exposed on the outer surface of the battery case, and insulation films (not shown) may be attached to the top and bottom sides of the electrode leads to protect the electrode leads.

In addition, the battery case may have a shape corresponding to the shape of the electrode assembly. For example, the battery case may be deformable into a desired shape. The shape and size of the battery case may not be completely equal to the shape and size of the electrode assembly so as to prevent a short circuit caused by slippage of the electrode assembly in the battery case. However, the shape and size of the battery case are not limited. That is, the shape and size of the battery case may be varied according to, for example, application conditions.

For example, the battery case may have a stepped shape according to the stepped shape of the electrode assembly as shown in FIG. 23. In addition, the battery case may have inclined surfaces (not shown) at positions facing stepped portions of the electrode assembly. For example, the battery case may have inclined surfaces extending from upper edges and corners of the stepped portions of the electrode assembly. The inclined surfaces of the battery case may include curved portions, and the slopes of the inclined surfaces may be 2 or greater.

The battery cell may be a lithium ion battery cell or lithium ion polymer battery cell. However, the battery cell is not limited thereto.

The battery cell may be used individually, or two or more such battery cells may be included in a battery pack. According to embodiments of the invention, such a battery cell and/or a battery pack may be used in various devices such as cellular phones, portable computers, smartphones, smart-pads, net books, light electronic vehicles (LEVs), electric vehicles, hybrid electric vehicles, plug-in hybrid electric vehicles, and general power storage devices. Structures and construction methods of such devices are well known in the art to which the present invention pertains, and thus, descriptions thereof will be omitted.

When the battery cell or battery pack is placed in such a device, a system component of the device may be disposed in a space remaining owing to the structure of the battery cell or battery pack. According to the embodiments of the invention, the battery cell or battery pack includes an stepped electrode assembly or stepped electrode assemblies having different sizes, and a battery case or battery cases of the battery cell or the battery pack are shaped according to the shape of the electrode assembly or electrode assemblies. Therefore, the space of a device using the battery cell or battery pack can be saved as compared with the case that the device uses a prismatic or elliptical battery cell or battery pack of the related art.

A system component of the device may be disposed in the saved space. In this case, the system component and the battery cell or battery pack may flexibly be disposed in the device, and thus the space of the device can be efficiently used. Furthermore, the thickness or volume of the device can be reduced to make the device slim.

The invention claimed is:

1. An electrode assembly comprising a plurality of electrode stacks including at least one stacked and folded type electrode stack in which a plurality of electrode units are stacked in a stacking direction such that the electrode units are separated by a sheet of separating film,
    wherein the stacked and folded type electrode stack comprises at least one stepped portion formed within the stacked and folded type electrode stack by the electrode units having different areas transverse to the stacking direction, the electrode units being stacked on one another with the sheet of separating film being disposed therebetween,
    wherein each of the electrode units comprises one selected from the group consisting of positive electrodes, negative electrodes, and unit cells, each unit cell having at least one positive electrode and at least one negative electrode that are stacked with a separator disposed therebetween,
    wherein the electrode assembly includes a Z-folded type electrode stack stacked together with a second electrode stack by using the separating film, the second electrode stack having a type selected from the group consisting of a jelly-roll type electrode stack, a stacked and folded type electrode stack, or a combination thereof, and
    wherein the electrode assembly comprises a second stepped portion formed between one of the plurality of electrode stacks and an adjacent second electrode unit.

2. The electrode assembly of claim 1, wherein the stacked and folded type electrode stack is a Z-folded type electrode stack.

3. The electrode assembly of claim 1, wherein the stacked and folded type electrode stack comprises one or two stepped portions.

4. The electrode assembly of claim 1, wherein mutually-facing electrodes of the electrode units having different areas have different polarities.

5. The electrode assembly of claim 1, wherein a larger one of mutually-facing electrodes of the electrode units having different areas is a negative electrode.

6. The electrode assembly of claim 1, wherein each of the unit cells has a type selected from the group consisting of a jelly-roll type, a stacked type, a laminated and stacked type, and a stacked and folded type.

7. The electrode assembly of claim 6, wherein unit cells having different areas and stacked on one another with a separator being disposed therebetween comprises at least one stepped portion.

8. The electrode assembly of claim 1, wherein the stacked and folded type electrode stack is a Z-folded type electrode stack, the electrode assembly further comprises at least one selected from the group consisting of stacked type electrode stacks, jelly-roll type electrode stacks, stacked and folded type electrode stacks, and combinations thereof.

9. The electrode assembly of claim 8, wherein at least one of the stacked type electrode stacks, the jelly-roll type electrode stacks, the stacked and folded type electrode stacks, and combinations thereof comprise a stepped portion.

10. The electrode assembly of claim 1, wherein the electrode stack comprises at least one electrode unit having at least one corner different in shape from the other corners thereof.

11. The electrode assembly of claim 1, wherein the electrode stack comprises at least one electrode unit having at least one curved corner.

12. The electrode assembly of claim 11, wherein the electrode stack comprises two or more electrode units each having at least one curved corner, and at least one of the curved corners of the electrode units has a different curvature than the curved corners of the other electrode units.

13. The electrode assembly of claim 1, wherein the electrode units are stacked in the electrode stack in a manner such that areas of the electrode units decrease in the stacking direction thereof.

14. The electrode assembly of claim 1, wherein the electrode units are stacked in the electrode stack in a manner such that corners of the electrode units are aligned in a line.

15. The electrode assembly of claim 1, wherein at least one of electrode units of the electrode stack adjoining each other with the separating film being disposed therebetween is disposed within a boundary of the other electrode unit.

16. The electrode assembly of claim 1, wherein centers of the electrode units of the electrode stack are aligned with each other.

17. The electrode assembly of claim 1, wherein the electrode units have the same thickness or different thicknesses.

18. The electrode assembly of claim 1, wherein an outermost electrode of the electrode assembly is a single-side-coated electrode having a non-coated side facing outward, and the separating film or a separator of the electrode assembly is exposed.

19. The electrode assembly of claim 18, wherein the single-side-coated electrode is a positive electrode.

20. The electrode assembly of claim 1, wherein an outermost electrode of the electrode assembly is a negative electrode, and the separating film or a separator of the electrode assembly is exposed.

21. The electrode assembly of claim 1, wherein the electrode units comprises electrode tabs corresponding to electrodes, respectively, and the electrode tabs have the same size or different sizes.

22. The electrode assembly of claim 1, wherein the electrode tabs are attached to a side or opposing sides of each of the electrode units.

23. A battery cell comprising:
the electrode assembly of any one of claim 1; and
a battery case accommodating the electrode assembly.

24. The battery cell of claim 23, wherein the battery case is a pouch type case.

25. The battery cell of claim 24, wherein the battery case has a stepped or inclined portion corresponding to a shape of the electrode assembly.

26. The battery cell of claim 23, wherein the battery cell is a lithium ion secondary battery cell or a lithium ion polymer secondary battery cell.

27. A device comprising at least one battery cell as claimed in claim 23.

28. The device of claim 27, wherein a system component of the device is disposed in a remaining space of the battery cell.

29. The device of claim 27, wherein the device is a cellular phone, a portable computer, a smartphone, a smartpad, a net book, an LEV (light electronic vehicle), an electric vehicle, a hybrid electric vehicle, a plug-in hybrid electric vehicle, or a power storage device.

* * * * *